US 9,003,537 B2

(12) United States Patent
Raz et al.

(10) Patent No.: US 9,003,537 B2
(45) Date of Patent: Apr. 7, 2015

(54) CVSS INFORMATION UPDATE BY ANALYZING VULNERABILITY INFORMATION

(71) Applicant: Hewlett-Packard Development Company, L.P., Houston, TX (US)

(72) Inventors: Barak Raz, Tel Aviv (IL); Ben Feher, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 36 days.

(21) Appl. No.: 13/755,831

(22) Filed: Jan. 31, 2013

(65) Prior Publication Data
US 2014/0215629 A1     Jul. 31, 2014

(51) Int. Cl.
| | |
|---|---|
| *G06F 11/00* | (2006.01) |
| *G06F 12/14* | (2006.01) |
| *G08B 23/00* | (2006.01) |
| *G06F 21/57* | (2013.01) |
| *G06F 11/30* | (2006.01) |
| *H04N 7/167* | (2011.01) |

(52) U.S. Cl.
CPC .................................... *G06F 21/577* (2013.01)

(58) Field of Classification Search
CPC . H04L 63/1433; H04L 63/1416; H04L 63/20; H04L 63/1408; G06F 21/577
USPC ................. 713/153–154, 187–188, 193–194; 726/1, 13, 22–33; 709/206, 249, 389
See application file for complete search history.

(56) References Cited

U.S. PATENT DOCUMENTS

| | | | |
|---|---|---|---|
| 8,095,984 B2 | 1/2012 | McFarlane et al. | |
| 2002/0147803 A1 | 10/2002 | Dodd et al. | |
| 2004/0010571 A1* | 1/2004 | Hutchinson et al. | .......... 709/220 |
| 2005/0015622 A1 | 1/2005 | Williams et al. | |
| 2007/0143827 A1 | 6/2007 | Nicodemus et al. | |
| 2007/0169199 A1* | 7/2007 | Quinnell et al. | ................. 726/25 |
| 2009/0024663 A1 | 1/2009 | McGovern | |
| 2009/0030751 A1 | 1/2009 | Barve et al. | |

(Continued)

OTHER PUBLICATIONS

"McAfee Vulnerability Manager"; < http://www.mcafee.com/in/products/vulnerability-manager.aspx >, Retrieved Jan. 8, 2013.
"RandomStorm announces new vulnerability management platform", < http://www.randomstorm.com/news-randomstorm-new-scanning.php >, Oct. 16, 2012.

(Continued)

*Primary Examiner* — Evans Desrosiers
(74) *Attorney, Agent, or Firm* — Hewlett-Packard Development Company, L.P.

(57) ABSTRACT

An automated system for automatic update of a Common Vulnerability Scoring System (CVSS) score, the system including vulnerability information analyzing functionality to analyze preexisting vulnerability information, the preexisting vulnerability information relating to at least one of at least one vulnerability and at least one attack vector thereof, the at least one vulnerability having a preexisting CVSS score, the preexisting CVSS score being based at least partially on the preexisting vulnerability information, vulnerability information extraction functionality, responsive to the analyzing preexisting vulnerability information, to extract new vulnerability information, the new vulnerability information relating to the at least one of the at least one vulnerability and the at least one attack vector thereof, and CVSS score updating functionality to employ the new vulnerability information to update the preexisting CVSS score.

20 Claims, 3 Drawing Sheets

(56) References Cited

U.S. PATENT DOCUMENTS

| | | |
|---|---|---|
| 2011/0277034 A1 | 11/2011 | Hanson |
| 2011/0307957 A1 | 12/2011 | Barcelo et al. |
| 2012/0102543 A1 | 4/2012 | Kohli et al. |
| 2012/0232679 A1 | 9/2012 | Abercrombie et al. |
| 2012/0304300 A1 | 11/2012 | LaBumbard |
| 2013/0239167 A1 | 9/2013 | Sreenivas et al. |
| 2013/0253978 A1 | 9/2013 | Adachi et al. |
| 2014/0007241 A1* | 1/2014 | Gula et al. ............ 726/25 |

OTHER PUBLICATIONS

"Started Trial of Automated Collection of Vulnerability Countermeasure Information Released by Product Developers", < http://www.ipa.go.jp/security/english/vuln/JVNiPedia2009q1_en.html >, May 2009.

Neuhaus, et al.; "Security Trend Analysis with CVE Topic Models", < http://dspace.ucalgary.ca/bitstream/1880/48066/1/2010-970-19.pdf >, Nov. 1-4, 2010.

Seville, "Common Vulnerability Scoring System (CVSS-SIG)", < http://www.first.org/cvss >, Jun. 20, 2007.

\* cited by examiner

CVSS INFORMATION UPDATE BY ANALYZING VULNERABILITY INFORMATION

BACKGROUND OF THE INVENTION

The Common Vulnerability Scoring System (CVSS) is an industry standard for assigning a score to computer system security vulnerabilities in an enterprise, the score being typically based on base score, environmental score metrics and temporal score metrics. These metrics are typically aggregated manually by a researcher.

BRIEF DESCRIPTION OF THE DRAWINGS

The present disclosure will be understood and appreciated more fully from the following detailed description, taken in conjunction with the drawings in which.

DETAILED DESCRIPTION OF PREFERRED EMBODIMENTS

The Common Vulnerability Scoring System (CVSS) is an industry standard for assigning a score to computer system security vulnerabilities in an enterprise, the score being based on the following metrics:

base score metrics which are inherent to a vulnerability, such as, for example, the complexity of the vulnerability, the impact of the vulnerability on confidentiality of information affected by the vulnerability, and the impact of the vulnerability on the integrity of information affected by the vulnerability;

environmental score metrics which evaluate the effect of a vulnerability within a particular enterprise, such as, for example, a percentage of enterprise assets which are vulnerable to the vulnerability and the percentage of enterprise data which may potentially be lost as a result of exploitation by the vulnerability; and temporal score metrics which evaluate vulnerability properties which typically change over time, such as, for example, the availability of an implementation of the vulnerability as an exploitation which may affect the enterprise, the type of remedy available against the vulnerability, and the level of verification that an implementation of the vulnerability exists.

It is appreciated that the metrics which comprise a CVSS score are typically aggregated manually by a researcher. While base score metrics are typically objective metrics which are inherent to a vulnerability and environmental score metrics are typically subjective metrics which are inherent to a particular enterprise, temporal score metrics typically change over time. Therefore, for a CVSS score to remain accurate over time, the temporal score metrics should be periodically updated. The present disclosure seeks to provide an automatic update mechanism for temporal score metrics comprised in a CVSS score by automatically analyzing vulnerability information which is commonly available on the internet.

Figure 1:
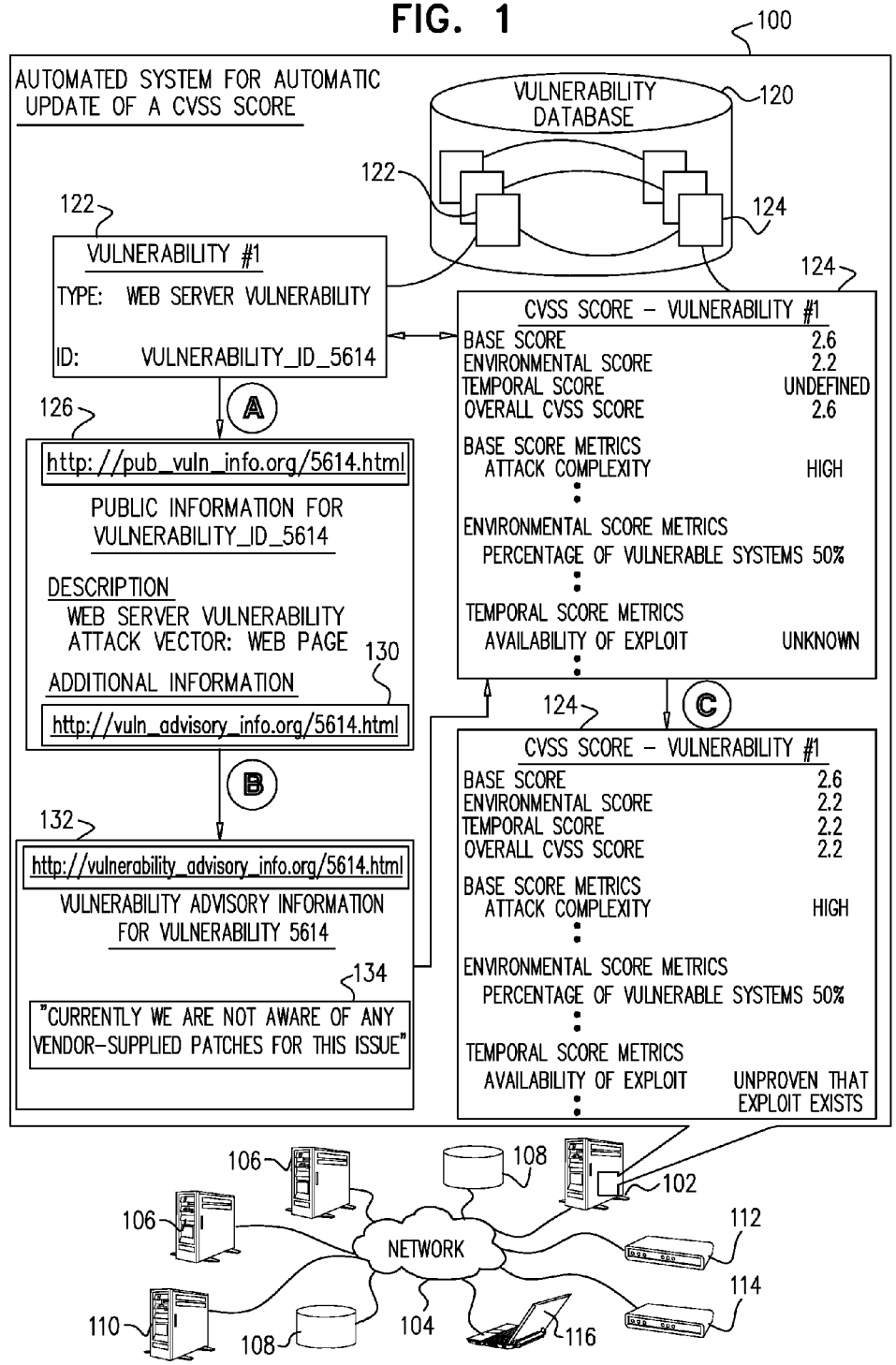
FIG. 1 is a simplified symbolic functional block diagram illustration of an automated system for automatic update of a Common Vulnerability Scoring System (CVSS) score and its functionality in accordance with an example.

Reference is now made to FIG. 1, which is a simplified symbolic functional block diagram illustration of an automated system for automatic update of a Common Vulnerability Scoring System (CVSS) score and its functionality in accordance with an example. The automated system for automatic update of a CVSS score 100 of FIG. 1 can be embodied in a computer product including a non-transitory, tangible computer-readable medium, such as a computer hard disk, in which computer program instructions are stored, and which can reside on a computer server 102, workstation, or other computing device connected to an enterprise-wide computer network 104. System 100 is preferably suitable for automatically updating CVSS scores of vulnerabilities potentially relevant to enterprise assets connected to network 104, such as, for example, computer servers 106, databases 108, web servers 110 and internee sites hosted thereupon, network routers 112, firewalls 114 and desktop computers 116 and operating systems residing thereupon.

System 100 is preferably operative to analyze preexisting vulnerability information, the preexisting vulnerability information relating to at least one of at least one vulnerability and at least one attack vector thereof. The at least one vulnerability can have a preexisting CVSS score, the preexisting CVSS score being based at least partially on the preexisting vulnerability information.

Responsive to analyzing preexisting vulnerability information, system 100 is also preferably operative to extract new vulnerability information relating to the at least one of the at least one vulnerability and the at least one attack vector thereof. System 100 is also operative to employ the new vulnerability information to update the preexisting CVSS score, as will be described hereinbelow.

As shown in the example of FIG. 1, system 100 includes a vulnerability database 120 comprising a collection of vulnerability records 122 and a collection of CVSS score records 124, each of which vulnerability records 122 comprising information pertaining to a particular vulnerability relevant to the enterprise, each of which vulnerability records 122 preferably having a corresponding CVSS score record 124.

As shown in step A of the example of FIG. 1, system 100 retrieves, from database 120, a particular vulnerability record 122 which corresponds to a CVSS score record 124. As shown in FIG. 1, vulnerability record 122 pertains to a web server vulnerability having an attack vector which is a web page, and having an industry-standard vulnerability identification code, such as, for example, VULNERABILITY_ID_ 5614.

Responsive to retrieving the industry-standard vulnerability identification code from vulnerability record 122, system 100 preferably utilizes the industry-standard vulnerability identification code to access a publicly available vulnerability information web page 126 which comprises publicly available information pertaining to vulnerability 122. The publicly available information may comprise, inter alia, a description of vulnerability 122, attack vectors of vulnerability 122, and a list of sources of vulnerability advisory information relating to vulnerability 122 and to attack vectors thereof in the form of one or more URLs 130, each of URLs 130 linking to a particular source of vulnerability advisory information.

It is a particular feature of the example of FIG. 1 that the analysis of web page 126 by system 100 and the retrieval of URLs 130 linking to sources of vulnerability advisory information is achieved, for example, by scanning web site 126 for textual patterns which are recognized by system 100 as typically corresponding to URLs and which reside in a section of web page 126 which matches a pattern corresponding to a section relating to vulnerability advisory information. It is appreciated that the scanning of web page 126 for vulnerability information may also comprise, for example, parsing web page 126.

As shown in step B of the example of FIG. 1, system 100 can retrieve at least one of URLs 130 of publicly available vulnerability information web page 126 and accesses web page 132, which comprises vulnerability advisory information 134 relating to vulnerability 122 and to attack vectors thereof such as, in particular, a web page. Vulnerability advisory information 134 may comprise, for example, information regarding a publicly available solution which is available for vulnerability 122 and its attack vector, or that a publicly available solution is not currently available for vulnerability 122 and its attack vector.

It is a particular feature of the example of FIG. 1, that the analysis of web page 132 by system 100 and the extraction of vulnerability advisory information 134 are achieved, for example, by scanning web page 132 for textual patterns which are recognized by system 100 as typically corresponding to vulnerability advisory information. It is appreciated that system 100 may also employ heuristic detection of vulnerability information found in the text of vulnerability advisory information 134. For example, the text of vulnerability advisory information 134 may include terms which are related to properties of vulnerabilities, such as the term "confirmed" which typically relates to a vulnerability for which a patch confirming the existence of the vulnerability exists, and the term "uncorroborated" which typically refers to a vulnerability for which a patch confirming the existence of the vulnerability does not exist. It is also appreciated that that system 100 may also utilize parsing of web page 132 as part of a search for vulnerability advisory information.

In the example of FIG. 1, vulnerability advisory information 134 comprised in web page 132 states that no know patches are available for vulnerability 122.

It is a particular feature of the example of FIG. 1 that system 100 is operative to analyze preexisting vulnerability information in the form of vulnerability record 122 and web page 126 to gain access to web page 132, from which web page 132 system 100 is operative to extract new vulnerability information relating to vulnerability 122 in the form of vulnerability advisory information 134, and to employ the new vulnerability information to update CVSS score record 124 corresponding to vulnerability record 122.

In the example of FIG. 1, CVSS score record 124 corresponding to vulnerability record 122 induces, for example, a base score which is based on base score metrics such as, for example, the attack complexity of vulnerability 122, which, in the example of FIG. 1 is ranked as "high". CVSS score record 124 also can include an environmental score, which is based on environmental score metrics such as, for example, a percentage of enterprise assets which are vulnerable to vulnerability 122, which, in the example of FIG. 1 is estimated as 50%. CVSS score record 124 also preferably includes a temporal score, which is based on temporal score metrics such as, for example, an "availability of exploit" metric which measures the availability of an implementation of the vulnerability as an exploitation that may affect the enterprise, which, in the example of FIG. 1, is "unknown". It is appreciated that a value of "unknown" typically corresponds to a vulnerability which has not been significantly researched, and it is therefore unknown whether there exists an implementation of the vulnerability as an exploitation that may affect the enterprise.

CVSS score record 124 also preferably includes an overall CVSS score which is based at least on the base score, the environmental score and the temporal score. In the example of FIG. 1, the overall CVSS score is initially calculated to be 2.6.

As shown in step C of FIG. 1, system 100 preferably utilizes vulnerability advisory information 134 retrieved from web page 132 to update CVSS score record 124 corresponding to vulnerability record 122. In particular, the "availability of exploit" property of the temporal score metrics of CVSS score 124 is updated from the initial value of "unknown" to a value of "unproven that exploit exists". It is appreciated that a value of "unproven that exploit exists" typically corresponds to a vulnerability which has been researched and implementation of the vulnerability as an exploitation that may affect the enterprise was not proven to exist. Such a vulnerability typically poses less of a threat to an enterprise than a vulnerability which has not been significantly researched. Therefore, a vulnerability having a value of "unproven that exploit exists" typically has a lower CVSS score than a vulnerability having a value of "unknown."

In the example of FIG. 1, the updating of the "availability of exploit" property of CVSS score 124 is operative, in turn, to update the temporal score of CVSS score 124 from "undefined" to 2.2, which is in turn operative to update the overall score of CVSS score 124 from 2.6 to 2.2.

Figure 2:
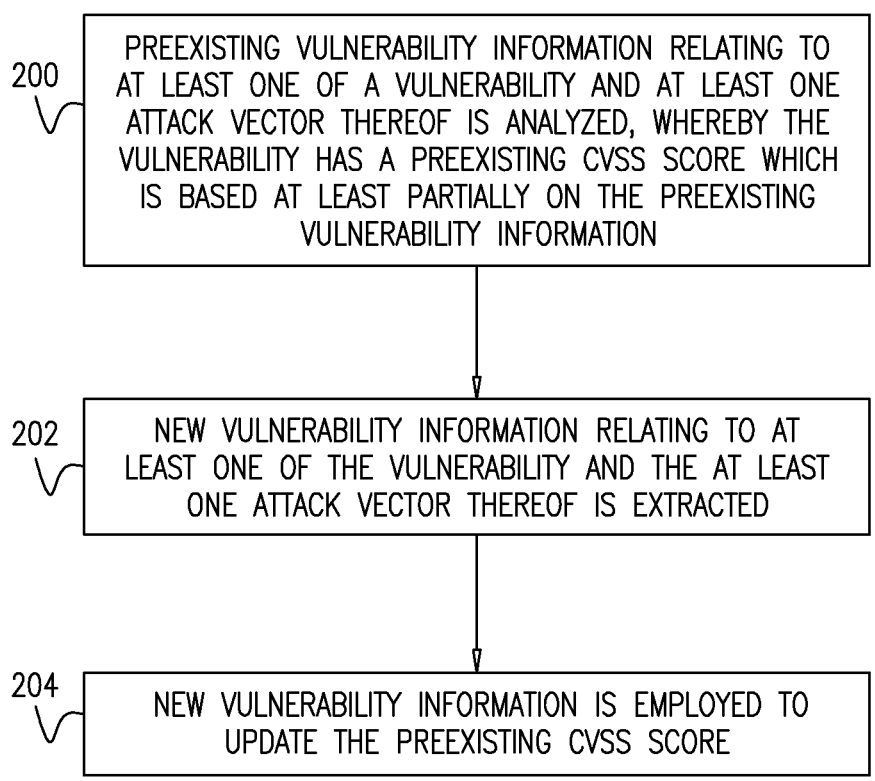
FIG. 2 is a simplified block diagram illustration indicating steps in the operation of the automated system for automatic update of the Common Vulnerability Scoring System (CVSS) score of FIG. 1, according to one example.

Reference is now made to FIG. 2, which is a simplified block diagram illustration indicating steps in the operation of the automated system for automatic update of the Common Vulnerability Scoring System (CVSS) score of FIG. 1, according to one example. As shown in FIG. 2, preexisting vulnerability information relating to at least one of a vulnerability and at least one attack vector thereof is initially analyzed, whereby the vulnerability has a preexisting CVSS score which is based at least partially on the preexisting vulnerability information (200). As described hereinabove with reference to FIG. 1, the preexisting vulnerability information which is analyzed may comprise, inter alia, a description of the vulnerability, attack vectors of the vulnerability, assets which are potentially vulnerable to the vulnerability, and a list of sources of vulnerability advisory information relating to the vulnerability and to attack vectors thereof. The vulnerability advisory information may be, for example, in the form of one or more URLs, each of URLs linking to a particular source of vulnerability advisory information. The advisory information typically also includes a description of the vulnerability.

Responsive to analyzing the preexisting vulnerability information, new vulnerability information relating to at least one of the vulnerability and the at least one attack vector thereof is then extracted (202). As described hereinabove with reference to FIG. 1, the new vulnerability information may be extracted, inter alia, from the sources of vulnerability advisory information cited in the preexisting vulnerability information.

Thereafter, the new vulnerability information is employed to update the preexisting CVSS score (204).

Figure 3:
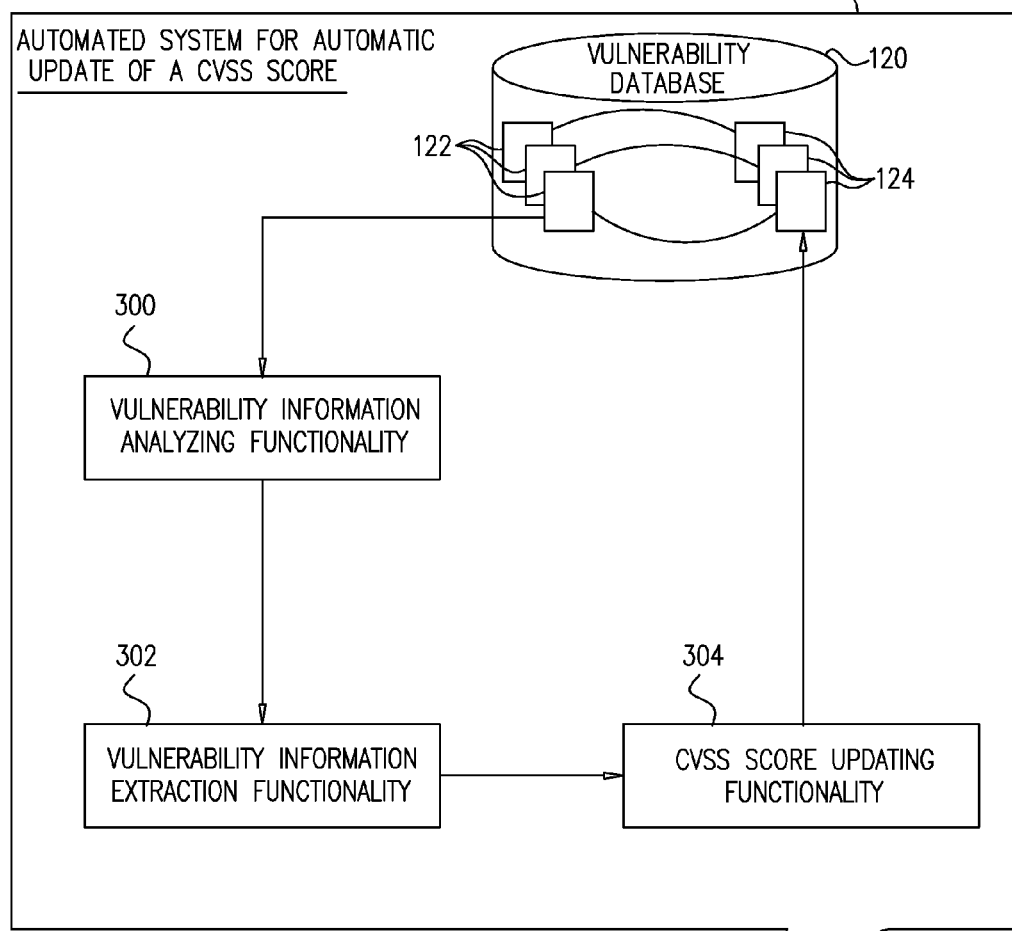
FIG. 3 is a simplified functional block diagram illustration of the system of FIG. 1, according to one example.
Figure 3:
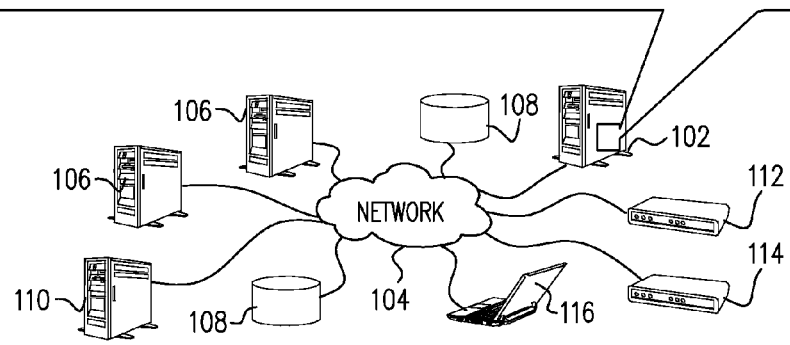

Reference is now made to FIG. 3, which is a simplified functional block diagram illustration of the system of FIG. 1, according to one example.

As shown in FIG. 3, and as described hereinabove with reference to FIG. 1, there is provided an automated system for automatic update of a Common Vulnerability Scoring System (CVSS) score 100 which can be embodied in a computer product including a non-transitory, tangible computer-readable medium, such as a computer hard disk, in which computer program instructions are stored, and which may reside on a computer server 102 connected to an enterprise-wide computer network 104. System 100 is preferably suitable for automatically updating CVSS scores of vulnerabilities potentially relevant to enterprise assets connected to network 104, such as, for example, computer servers 106, databases 108, web servers 110 and internet sites hosted thereupon, network routers 112, firewalls 114 and desktop computers 116 and operating systems residing thereupon.

System 100 preferably includes vulnerability database 120 comprising a collection of vulnerability records 122 and a collection of CVSS score records 124, each of which vulnerability records 122 preferably comprising information pertaining to a particular vulnerability relevant to the enterprise, each of which vulnerability records 122 preferably having a corresponding CVSS score record 124.

System 100 also can include vulnerability information analyzing functionality 300 operative to analyze preexisting vulnerability information which relates to at least one of at least one vulnerability and at least one attack vector thereof, the at least one vulnerability having a preexisting CVSS score, the preexisting CVSS score being based at least partially on the preexisting vulnerability information.

System 100 further can include vulnerability information extraction functionality 302, which is operative, responsive to analyzing preexisting vulnerability information by vulnerability information analyzing functionality 300, to extract new vulnerability information relating to the at least one of the at least one vulnerability and the at least one attack vector thereof.

System 100 yet further preferably includes CVSS score updating functionality 304 operative to employ the new vulnerability information extracted by vulnerability information extraction functionality 302 to update the preexisting CVSS score. Each of the functionality may include, for example, hardware devices including electronic circuitry for implementing the functionality described herein. In addition or as an alternative, each of the functionality may be implemented as a series of instructions encoded on a machine-readable storage medium of a computing device and executable by a processor. It should be noted that, in some embodiments, some of the functionality are implemented as hardware devices, while other functionality are implemented as executable instructions.

It will be appreciated by persons skilled in the art that the present disclosure is not limited by what has been particularly shown and described hereinabove. Rather the scope of the present disclosure includes both combinations and subcombinations of the various features described hereinabove as well as modifications thereof which would occur to persons skilled in the art upon reading the foregoing description and which are not in the prior art.

What is claimed is:

1. An automated system for automatic update of a Common Vulnerability Scoring System (CVSS) score, the system comprising:
   electronic circuitry for implementing vulnerability information analyzing functionality to analyze preexisting vulnerability information via:
      recognizing a URL linking to a source of vulnerability advisory information related to the preexisting vulnerability information, and
      recognizing a pattern of text corresponding to the preexisting vulnerability information of a vulnerability record,
   wherein the preexisting vulnerability information relates to at least one of a vulnerability or an attack vector, the vulnerability associated with a preexisting CVSS score, and the preexisting CVSS score being based at least partially on the preexisting vulnerability information;
   electronic circuitry for implementing vulnerability information extraction functionality, responsive to the recognizing the pattern of text, to extract new vulnerability information via:
      retrieving the URL, and
      scanning the source for a section related to the vulnerability advisory information that corresponds to the new vulnerability information,
   wherein the new vulnerability information relates to the at least one of the vulnerability or the attack vector; and
   electronic circuitry for implementing CVSS score updating functionality to employ the new vulnerability information to update the preexisting CVSS score.

2. The automated system for automatic update of the CVSS score according to claim 1, wherein the system further comprises:
   a vulnerability database comprising a collection of vulnerability records and a collection of CVSS score records, each of the vulnerability records comprising information pertaining to a particular vulnerability relevant to an enterprise, and each of the vulnerability records having a corresponding CVSS score record.

3. The automated system for automatic update of the CVSS score according to claim 2, wherein the preexisting vulnerability information is stored in at least one of the database or a publicly available web page.

4. The automated system for automatic update of the CVSS score according to claim 3, wherein the electronic circuitry for implementing vulnerability information analyzing functionality is to analyze the preexisting vulnerability information from the publicly available web page by employing at least one of:
   parsing the text of the publicly available web page;
   matching elements of the text of the publicly available web page to a predefined textual pattern, wherein the predefined textual pattern is associated with the preexisting vulnerability information; or
   heuristic detection of the preexisting vulnerability information found in the text of the publicly available web page.

5. The automated system for automatic update of the CVSS score according to claim 1, wherein the new vulnerability information is stored in a publicly available web page.

6. The automated system for automatic update of the CVSS score according to claim 5, wherein the electronic circuitry for implementing vulnerability information extraction functionality is to extract the new vulnerability information from the publicly available web page by employing at least one of:
   parsing the text of the publicly available web page;
   matching elements of the text of the publicly available web page to a predefined textual pattern, wherein the predefined textual pattern is associated with the new vulnerability information; or
   heuristic detection of the new vulnerability information is found in the text of the publicly available web page.

7. A computing device for automatic update of a Common Vulnerability Scoring System (CVSS) score, including a non-transitory, tangible computer-readable medium with computer program instructions stored thereon, the instructions, when executed by a processor, cause the processor to:
   recognize text corresponding to preexisting vulnerability information of a vulnerability record, and
   recognize a source of vulnerability advisory information related to the preexisting vulnerability information,
      wherein the preexisting vulnerability information relates to at least one of a vulnerability or an attack vector, the vulnerability associated with a preexisting CVSS score, and the preexisting CVSS score being based at least partially on the preexisting vulnerability information;
responsive to the recognized text corresponding to the preexisting vulnerability information, extract new vulnerability information from the source,
wherein the new vulnerability information relates to the at least one of the vulnerability or the attack vector; and
employ the new vulnerability information to update the preexisting CVSS score.

8. The computing device for automatic update of the CVSS score according to claim 7, wherein the preexisting vulnerability information is stored in a publicly available web page.

9. The computing device for automatic update of the CVSS score according to claim 8, wherein while analyzing preexisting vulnerability information, the processor performs at least one of:
parsing the text of the publicly available web page;
matching elements of the text of the publicly available web page to a predefined textual pattern, wherein the predefined textual pattern is associated with the preexisting vulnerability information; or
heuristic detection of the preexisting vulnerability information found in the text of the publicly available web page.

10. The computing device for automatic update of the CVSS score according to claim 7, wherein the new vulnerability information is stored in publicly available web page.

11. The computing device for automatic update of CVSS score according to claim 10, wherein while extracting preexisting vulnerability information, the processor performs least one of:
parsing the text of the publicly available web page;
matching elements of the text of the publicly available web page to a predefined textual pattern, wherein the predefined textual pattern is associated with the new vulnerability information; or
heuristic detection of the new vulnerability information found in the text of the publicly available web page.

12. A method for automatic update of a Common Vulnerability Scoring System (CVSS) score, said method being implemented in a computing system comprising at least one physical processor, the method comprising:
analyzing preexisting vulnerability information of a vulnerability record;
analyzing a source of vulnerability advisory information related to said preexisting vulnerability information,
wherein the preexisting vulnerability information relates to at least one of a vulnerability or an attack vectors, the vulnerability associated with a preexisting CVSS score, and the preexisting CVSS score including a temporal score based at least partially on the preexisting vulnerability information;
responsive to the analyzing preexisting vulnerability information, extracting, from the source, new vulnerability information corresponding to a vulnerability property of a temporal score metric,
wherein the new vulnerability information relates to the at least one of the vulnerability or the attack vector; and
employing the new vulnerability information to update the temporal score of the preexisting CVSS score of a CVSS score record corresponding to the vulnerability record.

13. The method for automatic update of the CVSS score according to claim 12, wherein the preexisting vulnerability information and the new vulnerability information are each stored in a publicly available web page.

14. The method for automatic update of the CVSS score according to claim 13, wherein the analyzing preexisting vulnerability information further comprises:
parsing the text of the publicly available web page.

15. The method for automatic update of the CVSS score according to claim 13, wherein the extracting new vulnerability information further comprises:
parsing the text of the publicly available web page.

16. A method for automatic update of the CVSS score according to claim 13, wherein the extracting new vulnerability information further comprises:
matching elements of the text of the publicly available web page to a predefined textual pattern, wherein the predefined textual pattern is associated with the new vulnerability information.

17. A method for automatic update of the CVSS score according to claim 13, wherein the extracting new vulnerability information further comprises:
heuristically detecting the new vulnerability information in the text of the publicly available web page.

18. A method for automatic update of the CVSS score according to claim 13, wherein the analyzing preexisting vulnerability information further comprises:
matching elements of the text of the publicly available web page to a predefined textual pattern, wherein the predefined textual pattern is associated with preexisting vulnerability information.

19. A method for automatic update of the CVSS score according to claim 13, wherein the analyzing preexisting vulnerability information further comprises:
heuristically detecting the preexisting vulnerability information in the text of the publicly available web page.

20. A method for automatic update of the CVSS score according to claim 12, further comprising:
calculating a new CVSS score based on the update to the temporal score, the new CVSS score calculated based on a base score, an environmental score, and the temporal score.

* * * * *

UNITED STATES PATENT AND TRADEMARK OFFICE
CERTIFICATE OF CORRECTION

PATENT NO. : 9,003,537 B2
APPLICATION NO. : 13/755831
DATED : April 7, 2015
INVENTOR(S) : Barak Raz et al.

Page 1 of 1

It is certified that error appears in the above-identified patent and that said Letters Patent is hereby corrected as shown below:

IN THE SPECIFICATION

In column 2, line 16, delete "internee" and insert -- internet --, therefor.

In column 3, line 31, delete "that that" and insert -- that --, therefor.

In column 3, line 48, delete "induces" and insert -- includes --, therefor.

IN THE CLAIMS

In column 7, line 30, in Claim 11, delete "CVSS" and insert -- the CVSS --, therefor.

In column 7, line 32, in Claim 11, delete "least" and insert -- at least --, therefor.

Signed and Sealed this
Sixteenth Day of February, 2016

Michelle K. Lee
*Director of the United States Patent and Trademark Office*